United States Patent
Takeda et al.

(10) Patent No.: US 6,187,853 B1
(45) Date of Patent: Feb. 13, 2001

(54) PROCESS FOR THE PREPARATION OF DISPERSIONS USING VISCOSITY-INCREASE INHIBITORS OF WATER-SOLUBLE POLYMERS

(75) Inventors: Hisao Takeda; Takumi Ohara; Mika Suzuki; Kenji Sakai, all of Tokyo (JP)

(73) Assignee: Hymo Corporation, Tokyo (JP)

( * ) Notice: Under 35 U.S.C. 154(b), the term of this patent shall be extended for 0 days.

(21) Appl. No.: 09/331,031

(22) PCT Filed: Oct. 13, 1998

(86) PCT No.: PCT/JP98/04606

§ 371 Date: Jul. 6, 1999

§ 102(e) Date: Jul. 6, 1999

(87) PCT Pub. No.: WO99/20658

PCT Pub. Date: Apr. 29, 1999

(30) Foreign Application Priority Data

Oct. 16, 1997 (JP) .................................... 9-297908
Dec. 25, 1997 (JP) .................................... 9-366140
Dec. 25, 1997 (JP) .................................... 9-366181

(51) Int. Cl.$^7$ .................................................. C08F 2/10
(52) U.S. Cl. ........................ 524/457; 524/458; 524/460; 526/74; 526/201; 526/303.1
(58) Field of Search ................................. 524/457, 458, 524/460; 526/74, 201, 303.1

(56) References Cited

U.S. PATENT DOCUMENTS 4,929,655 * 5/1990 Takeda et al. ...................... 524/458
5,597,858 * 1/1997 Ramesh et al. ..................... 524/458

FOREIGN PATENT DOCUMENTS

| 0525751A1 | 7/1992 | (EP) . |
| 0637598A2 | 2/1995 | (EP) . |
| 62-20502 | 1/1987 | (JP) . |
| 8-269111 | 10/1996 | (JP) . |

* cited by examiner

*Primary Examiner*—David W. Wu
*Assistant Examiner*—Kelechi C. Egwim
(74) *Attorney, Agent, or Firm*—Ostrolenk, Faber, Gerb & Soffen, LLP

(57) ABSTRACT

A process for producing a water-soluble polymer dispersion comprising polymerizing water-soluble monomers having double bonds in an aqueous salt solution that dissolves the monomers but does not dissolve the formed polymer while stirring in the presence of a dispersant composed of a polymer electrolyte soluble in this aqueous salt solution to obtain fine polymer particles dispersed in the aqueous salt solution, characterized by adding at least one viscosity-increase suppressor selected from the group consisting of: (A) a polyvalent carboxylic acid or a salt thereof, (B) a polyvalent phenol, (C) a cyclic compound containing a hydroxyl group and a carboxyl group or a salt thereof, (D) gluconic acid or a salt thereof, (E) a reaction product obtained by reacting methoxyhydroquinone and/or (meth) acrylic cationic monomer with a compound that generates radicals in an oxidizing atmosphere, (F) a reaction product obtained by reacting (meth)acrylic cationic polymer with a compound that generates radicals in an oxidizing atmosphere, (G) a reaction product obtained by reacting (meth)acrylic cationic polymer with an oxidant, and a mixture thereof.

11 Claims, No Drawings

PROCESS FOR THE PREPARATION OF DISPERSIONS USING VISCOSITY-INCREASE INHIBITORS OF WATER-SOLUBLE POLYMERS

TECHNICAL FIELD

The present invention relates to a process for producing a dispersion of a water-soluble polymer having low viscosity and high fluidity, dispersed in an aqueous salt solution as dispersionmedium, and widely used in, for example, a flocculant and a dewatering agent used as a water treatment agent, paper production chemicals used in a papermaking process, a dispersion stabilizer of various types of suspensions or a soil improver, and more particularly, to a process for producing a water-soluble polymer dispersion characterized by adding a specific chemical substance to maintain the viscosity of the reaction solution at a low level during polymerization.

BACKGROUND ART

As an example of a process for producing a dispersion of fine water-soluble polymer particles in an aqueous salt solution as dispersion medium having low viscosity and high fluidity in the prior art, processes comprising polymerizing while stirring in the presence of a dispersant such as polymer electrolyte are disclosed in European Patent Publication No. 0183466 and European Patent Publication No. 0364175.

In the case of carrying out the processes disclosed in the patent publications described above, the phenomenon occurs in which the viscosity of the reaction solution increases significantly during polymerization. Consequently, a large load is applied to the agitator, thereby creating the need to use a high-powered motor and stirring blades that are able to withstand high levels of torque. This results in the problem of high cost of the reaction apparatus. In addition, since the viscosity of the reaction solution becomes high, there are portions that are not mixed properly, thereby resulting in the additional problem of the formation of coarse particles.

DISCLOSURE OF THE INVENTION

As a result of conducting various studies on a process that solves the above-mentioned problems, the inventors of the present invention found that by adding a specific chemical substance to the reaction solution, the increase in viscosity of the reaction solution during polymerization can be suppressed, thereby leading to completion of the present invention.

Namely, in a process for producing a water-soluble polymer dispersion comprising polymerizing water-soluble monomers having double bonds in an aqueous salt solution that dissolves the monomers but does not dissolve the formed polymer while stirring in the presence of a dispersant composed of a polymer electrolyte soluble in this aqueous salt solution to obtain fine polymer particles dispersed in the aqueous salt solution, the present invention suppresses the phenomenon of the significant increase in viscosity of the reaction solution during polymerization by adding at least one viscosity-increase suppressor selected from the group consisting of:

(A) a polyvalent carboxylic acid or a salt thereof,
(B) a polyvalent phenol,
(C) a cyclic compound containing a hydroxyl group and a carboxyl group or a salt thereof,
(D) gluconic acid or a salt thereof,
(E) a reaction product obtained by reacting methoxyhydroquinone and/or (meth)acrylic cationic monomer with a compound that generates radicals in an oxidizing atmosphere,
(F) a reaction product obtained by reacting (meth)acrylic cationic polymer with a compound that generates radicals in an oxidizing atmosphere,
(G) a reaction product obtained by reacting (meth)acrylic cationic polymer with an oxidant, and a mixture thereof, thereby making it possible to carry out production even with a low-powered agitator, while also reducing the formation of coarse particles.

In the present invention, it is preferable that the water-soluble monomers having double bonds be composed of 0–30 mol % acrylic acid, 0–100 mol % acrylamide and 0–100 mol % cationic monomer represented by the following formula 1 and/or the following formula 2:

[formula 1]

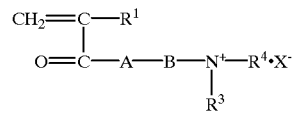

(wherein, A represents O or NH, B represents $C_2H_4$, $C_3H_6$ or $C_3H_5OH$, $R^1$ represents H or $CH_3$, $R^2$ and $R^3$ represent an alkyl group having 1–4 carbon atoms, $R^4$ represents hydrogen, an alkyl group having 1–4 carbon atoms or benzyl group, and $X^-$ represents a counter ion);

[formula 2]

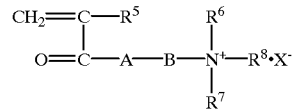

(wherein, A represents O or NH, B represents $C_2H_4$, $C_3H_6$ or $C_3H_5OH$, $R^5$, $R^6$, $R^7$ and $R^8$ represent H or $CH_3$, and $X^-$ represents a counter ion)

In the present invention, it is preferable that said dispersant be a cationic polymer electrolyte in which 50–100 mol % of at least one type of cationic monomer selected from the group consisting of dimethylaminoethyl(meth)acrylate salt, dimethylaminopropyl(meth)acrylamide salt, di(meth)allylamine salt, (meth)acryloyloxyethyltrimethylammonium chloride, (meth)acrylamidopropyltrimethylammonium chloride, dimethyldiallylammonium chloride and a mixture thereof, and 50–0 mol % acrylamide are polymerized.

In the present invention, it is preferable that a salt that forms the aqueous salt solution be a bivalent anionic salt.

At this time, it is preferable that the (A) polyvalent carboxylic acid or the salt thereof be oxalic acid, adipic acid, tartaric acid, malic acid, phthalic acid and salts thereof.

Further, it is preferable that the (B) polyvalent phenol be resorcinol or pyrogallol.

In addition, it is preferable that the (C) cyclic compound having a hydroxyl group and a carboxyl group be m-hydroxybenzoic acid, p-hydroxybenzoic acid, salicylic acid, gallic acid, tannic acid and a salt thereof.

In addition, the viscosity-increase suppressor (E) can be obtained by reacting a compound that generates radicals in an oxidizing atmosphere in a solution containing methoxyhydroquinone and/or (meth)acrylic cationic monomer.

Furthermore, the viscosity-increase suppressor (F) can be obtained by reacting a compound that generates radicals in an oxidizing atmosphere with (meth)acrylic cationic polymer.

The viscosity-increase suppressor (G) can be obtained by reacting an oxidant with (meth)acrylic cationic polymer.

It is preferable that the total added amount of the viscosity-increase suppressors listed in (A) through (G) above be from 10 ppm to 10,000 ppm based on the weight of the reaction mixture.

BEST MODE FOR CARRYING OUT THE INVENTION

The present invention will be explained in detail below.

The present invention is a process for producing a water-soluble polymer dispersion comprising polymerizing water-soluble monomers having double bonds in an aqueous salt solution that dissolves the monomers but does not dissolve the formed polymer while stirring in the presence of a dispersant composed of a polymer electrolyte soluble in this aqueous salt solution to obtain fine polymer particles dispersed in the aqueous salt solution, characterized by adding at least one viscosity-increase suppressor selected from the group consisting of:

(A) a polyvalent carboxylic acid or a salt thereof, (B) a polyvalent phenol, (C) a cyclic compound containing a hydroxyl group and a carboxyl group or a salt thereof, (D) gluconic acid or a salt thereof, (E) a reaction product obtained by reacting methoxyhydroquinone and/or (meth)acrylic cationic monomer with a compound that generates radicals in an oxidizing atmosphere, (F) a reaction product obtained by reacting (meth)acrylic catinic polymer with a compound that generates radicals in an oxidizing atmosphere, (G) a reaction product obtained by reacting (meth)acrylic cationic polymer with an oxidant, and a mixture thereof.

The water-soluble monomer having double bonds used in the present invention is suitably selected from cationic monomers such as an amine salt of dialkylaminoalkyl (meth) acrylate and quaternary compounds thereof, an amine salt of dialkylaminoalkyl(meth)acrylamide and quaternary compounds thereof, an amine salt of dialkylaminopropyl (meth) acrylamide and quaternary compounds thereof, an amine salt of dialkylaminohydroxypropyl(meth) acrylamide and quaternary compounds thereof and diallylamines salt and quaternary compounds thereof; nonionic monomers such as (meth)acrylamide, N-vinylcarboxylic acid amide, acrylonitrile and vinyl acetate; anionic monomers such as (meth)acrylic acid, acrylamide-2-methylpropane sulfonic acid and itaconic acid and their salts; and, mixtures thereof.

Specific examples of these water-soluble monomers having double bonds include, but are not limited to, cationic monomers such as a hydrochloride or sulfate of dimethylaminoethyl(meth)acrylate, (meth) acryloyloxyethyltrimethylammonium chloride, (meth) acryloyloxyethyldimethylbenzylammonium chloride, a hydrochloride or sulfate of dimethylaminopropyl (meth) acrylamide (meth)acrylamidopropyltrimethylammonium chloride, (meth) acrylamidopropyldimethylbenzylammonium chloride, a hydrochloride or sulfate of dimethylaminohydroxypropyl (meth)acrylate, (meth) acryloyloxyhydroxypropyltrimethylammonium chloride, (meth) acryloyloxyhydroxypropyldimethylbenzylammonium chloride and diallyldimethylammonium chloride; nonionic monomers such as (meth)acrylamide, N-vinylformamide, N-vinylacetoamide and hydroxyethyl(meth)acrylate; and, anionic monomers such as (meth)acrylic acid, acrylamido-2-methylpropane sulfonic acid and itaconic acid and the like. In addition, hydrophobic monomers such as acrylonitrile, vinyl acetate and styrene or the like can be copolymerized provided that the polymer remains water-soluble.

Polymers that form the water-soluble polymer dispersion of the present invention are polymers of the above-mentioned monomers, and examples of particularly useful polymers include homopolymers of cationic monomers, cationic polymers such as copolymers of cationic monomers and nonionic monomers such as acrylamide, amphoteric polymers such as copolymers of cationic monomers, nonionic monomers such as acrylamide and anionic monomers such as acrylic acid, and nonionic polymers such as homopolymers of nonionic monomers such as acrylamide.

Accordingly, more preferable water-soluble monomers having double bonds that can be used in the present invention are composed of 0–50 mol % acrylic acid, 0–100 mol % acrylamide and 0–100 mol % cationic monomer represented by the following formula 1 and/or the cationic monomer represented by the following formula 1 and/or the following formula 2:

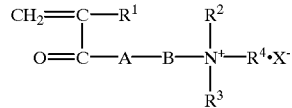

[formula 1]

(wherein, A represents O or NH, B represents $C_2H_4$, $C_3H_6$ or $C_3H_5OH$, $R^1$ represents H or $CH_3$, $R^2$ and $R^3$ represent an alkyl group having 1–4 carbon atoms, $R^4$ represents hydrogen, an alkyl group having 1–4 carbon atoms or benzyl group, and $X^-$ represents a counter ion);

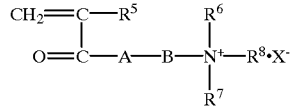

[formula 2]

(wherein, A represents O or NH, B represents $C_2H_4$, $C_3H_6$ or $C_3H_5OH$, $R^5$, $R^6$, $R^7$ and $R^8$ represent H or $CH_3$, and $X^-$ represents a counter ion)

The dispersant composed of polymer electrolyte used in the present invention is preferably a cationic polymer electrolyte obtained by polymerizing 50–100 mol % of at least one cationic monomer selected from the group consisting of a hydrochloride or sulfate of dimethylaminoethyl(meth) acrylate, hydrochloride or sulfate of dimethylaminopropyl (meth)acrylamide, (meth) acrylamidopropyltrimethylammonium chloride, a hydrochloride or sulfate of diallylamine, a hydrochloride or sulfate of dimethallylamine, dimethyldiallylammonium chloride and a mixture thereof, with 50–0 mol % acrylamide. In addition, a polyamine such as polyalkylenepolyamine can also be used.

In addition, in the case of trying to obtain a dispersion of an anionic polymer, a polymer or copolymer of an anionic monomer selected from the group consisting of a salt of (meth) acrylic acid, a salt of acrylamido-2-methylpropanesulfonic acid and so forth and a mixture thereof can also be used for the dispersant.

The polymer electrolyte that serves as a dispersant in the present invention can be obtained by dissolving a monomer in an aqueous medium, adding a polymerization initiator such as a water-soluble azo-type polymerization initiator like 2,2'-azobis(2-amidinopropane) 2-hydrochloride (abbreviated as V-50) or 2,2'-azobis[2-(2-imidazoline-2-yl)propane] 2-hydrochloride (abbreviated as VA-044), or a water-soluble redox-type polymerization initiator like the combined use of ammonium persulfate and sodium hydrogensulfite and performing radical polymerization to obtained the desired dispersant. The reaction temperature of polymerization can be arbitrarily selected within the range of 0–100° C. according to the properties of the polymerization initiator. The addition of a chain transfer agent such as isopropyl alcohol and mercaptan, which are normally used in radical polymerization to adjust molecular weight, can also be arbitrarily selected. Although polymerization of the polymer electrolyte that serves as a dispersant is normally performed by standing aqueous solution polymerization, it is preferable to perform polymerization while stirring in consideration of product uniformity.

In the present invention, the aqueous salt solution that serves as the dispersion medium of the water-soluble polymer dispersion is an aqueous salt solution that dissolves both the raw material water-soluble monomer and dispersant composed of polymer electrolyte, but does not dissolve the fine particles of product polymer. Consequently, a type of salt having those properties is used in the present invention in the form of an aqueous salt solution of a concentration at which those properties are demonstrated.

Salts suitable for use in the present invention are bivalent anionic salts like sulfates, while the counter cation is selected from ammonium ion, sodium ion, magnesium ion, aluminum ion and so forth. Specific examples of salts include ammonium sulfate, ammonium hydrogen sulfate, sodium sulfate, sodium hydrogen sulfate, magnesium sulfate, magnesium hydrogen sulfate, aluminum sulfate and aluminum hydrogen sulfate. Ammonium sulfate and sodium sulfate in particular are the most preferable as salts used in the present invention. In order for these bivalent anionic salts to have the above-mentioned properties, the concentration of the salt is selected within the range of 15% by weight to saturation concentration. In addition, monovalent anionic salts such as sodium chloride and ammonium chloride can also be used in combination with the above-mentioned bivalent anionic salts.

Methods for improving the fluidity and so forth of the dispersion by adding various types of salts to the water-soluble polymer dispersion obtained after polymerization are described in the patent publications mentioned in the background art, and the arts are incorporated in the present invention.

In the obtaining of the above-mentioned polymer fine particles, by adding at least one viscosity-increase suppressor selected from the group consisting of (A) a polyvalent carboxylic acid or a salt thereof, (B) a polyvalent phenol, (C) a cyclic compound containing a hydroxyl group and a carboxyl group or a salt thereof, (D) gluconic acid or a salt thereof, (E) a reaction product obtained by reacting methoxyhydroquinone (MEHQ) and/or (meth)acrylic cationic monomer with a compound that generates radicals in an oxidizing atmosphere, (F) a reaction product obtained by reacting (meth)acrylic cationic polymer with a compound that generates radicals in an oxidizing atmosphere, (G) a reaction product obtained by reacting (meth) acrylic cationic polymer with an oxidant, and a mixture thereof, large increases in viscosity of the reaction solution during polymerization can be suppressed, thereby making it possible to carry out production even with a low-powered agitator while also reducing the formation of coarse particles.

It is preferable that the viscosity-increase suppressor be a water-soluble compound, and even more preferable that is dissolved in the aqueous salt solution serving as the dispersion medium. Specific examples of water-soluble compounds among the viscosity-increase suppressors (A) through (G) include, but are not limited to, the compounds indicated below.

Specific examples of the (A) polyvalent carboxylic acid or the salt include oxalic acid, adipic acid, tartaric acid, malic acid, phthalic acid and their salts.

Specific examples of (B) polyvalent phenols include resorcinol and pyrogallol.

Specific examples of (C) cyclic compounds having a hydroxyl group and a carboxyl group include m-hydroxybenzoic acid, p-hydroxybenzoic acid, salicylic acid, gallic acid, tannic acid and their salts.

Specific examples of (D) viscosity-increase suppressors composed of one type of water-soluble organic compound selected from gluconic acid and its salts include gluconic acid, sodium gluconate, potassium gluconate, ammonium gluconate and various amine salts of gluconic acid.

In the obtaining of the viscosity-increase suppressor defined in (E), a compound that generates radicals is allowed to react while blowing an oxygen-containing gas into a solution containing MEHQ and/or (meth)acrylic cationic monomer. This compound that generates radicals may be the same compound as a polymerization initiator normally used in radical polymerization, examples of which include a water-soluble azo-type polymerization initiator like V-50 or VA-044, or a water-soluble redox-type polymerization initiator like the combined use of ammonium persulfate and sodium hydrogensulfite.

In the obtaining of the viscosity-increase suppressor defined in (F), a polymerization initiator which is a compound that generates radicals, examples of which include a water-soluble azo-type polymerization initiator like V-50 or VA-044, or a water-soluble redox-type polymerization initiator like the combined use of ammonium persulfate and sodium hydrogensulfite, is allowed to react in an oxidizing atmosphere, for example while blowing in oxygen-containing gas, with the dispersant of the present invention composed of polymer electrolyte obtained by polymerization of (meth) acrylic cationic monomer in accordance with known methods, ultimately enabling the obtaining of a viscosity-increase suppressor similar to (E).

In the obtaining of the viscosity-increase suppressor defined in (G), a low molecular weight oxidized polymer is obtained by oxidizing the dispersant of the present invention composed of polymer electrolyte obtained by polymerization of (meth)acrylic cationic monomer in accordance with known methods using hydrogen peroxide or halogen oxidant, ultimately allowing the obtaining of a viscosity-increase suppressor similar to (E) and (F).

Specific examples of (meth) acrylic cationic monomers used to obtain the viscosity-increase suppressors (E), (F) and (G) include cationic monomers such as a hydrochloride or sulfate of dimethylaminoethyl(meth)acrylate, (meth)acryloyloxyethyltrimethylammonium chloride, (meth)acryloyloxyethyldimethylbenzylammonium chloride, a hydrochloride or sulfate of dimethylaminopropyl(meth)acrylamide, (meth)acrylamidopropyltrimethylammonium chloride, (meth)acrylamidopropyldimethylbenzylammonium chloride, a hydrochloride or sulfate of dimethylaminohydroxypropyl (meth)acrylate, (meth)acryloyloxyhydroxypropyltrimethylammonium chloride, (meth)acryloyloxyhydroxypropyldimethylbenzylammonium chloride, and the like.

These viscosity-increase suppressors (A) through (G) are added in an amount of 10 ppm to 10,000 ppm relative to the weight of the reaction solution. If the added amount is 10 ppm or less, effects are not demonstrated, while if the amount is 10,000 ppm or more, it is economically wasteful.

The water-soluble organic compounds specifically listed in the above-mentioned (A) through (G) were found from experimental considerations, and may be respectively used alone or as a combination of a plurality of types.

The effect of suppressing viscosity-increase of the reaction system by these compounds has not been theoretically elucidated. Based on experimental results, the polymer formed in the reaction solution has a higher solubility for the aqueous salt solution in which non-polymerized monomer is dissolved than the simple aqueous salt solution in which only the salt used is dissolved, and viscosity-increase is considered to occur due to the polymer dissolving in solution prior to precipitation. Thus, since the viscosity-increase suppressors (A) through (G) of the present invention promote precipitation of fine particles of polymer, viscosity-increase is suppressed as a result of causing the polymer to precipitate as fine particles before dissolving in solution, thereby resulting in a decrease in torque applied to the rotary shaft of the reaction apparatus and reducing the occurrence of coarse particles generated accompanying defective stirring.

In order to obtain a dispersion of water-soluble polymer in the present invention, monomers, dispersant and viscosity-increase suppressor are dissolved in an aqueous salt solution, a polymerization initiator, such as a water-soluble azo-type polymerization initiator like V-50 or VA-044, or a water-soluble redox-type polymerization initiator like the combined use of ammonium persulfate and sodium hydrogensulfite, is added in a state of oxygen gas removal in a nitrogen atmosphere, and radical polymerization is carried out while stirring. The polymerization reaction temperature can be arbitrarily selected according to the properties of the polymerization initiator within a range of 0–100° C. The addition of a chain transfer agent like isopropyl alcohol and mercaptan, which are normally used in radical polymerization to adjust molecular weight, can also be arbitrarily selected. It is necessary to perform stirring at a peripheral speed of at least 1 m/min in order to ensure smooth precipitation of polymer fine particles. There is no upper limit on stirring rate provided the contents do not overflow from the apparatus, and arbitrary stirring conditions can be selected.

A known arbitrary charge method can be employed for charging monomer, examples of which include a method in which the entire amount of monomer is charged into the reaction vessel in advance, a method in which a portion of monomer is charged into the reaction vessel in advance after which the remainder of monomer is added continuously, and a method in which the entire amount of monomer is added continuously during polymerization.

EXAMPLES

Although a detailed explanation of the present invention is provided through by means of examples, the present invention is not limited to the following embodiments provided that its scope is not departed.

Examples 1–15

The monomers having compositions and molar ratios listed in Table 1, the water-soluble organic compounds (A) through (D) as a viscosity-increase suppressor listed in Table 1 in the amounts listed in Table 1, and 1 part of polydimethyldiallylammonium chloride (manufactured by CPS Corp., trade name: Age Flock WT40HV) and 1 part of polymethacryloyloxyethyltrimethylammonium chloride (intrinsic viscosity: 2 dl/g) as dispersants were charged in a reaction vessel (inner diameter: 70 cm, volume: 270 liters) equipped with a stirrer, nitrogen aeration tube, temperature controller and helical ribbon impeller (diameter: 65 cm, rotating speed: 60 rpm) followed by the addition of deionized water and ammonium sulfate to reach the monomer concentrations and ammonium sulfate concentrations listed in Table 1 and dissolving by stirring to form a uniform solution. Next, a 5% by weight aqueous solution of V-50 was added as a polymerization initiator in an amount of 100 ppm per monomers followed by stirring and polymerization was carried out for 10 hours at 48° C. As a result, polymer dispersions were obtained comprising fine particles having a particle diameter of 10–20 μm dispersed in an aqueous salt solution.

The maximum values of torque loaded to the rotary shaft of the agitator during the polymerization reaction are shown in Table 1. In addition, the results of weighing the amount of polymer remaining on a sieve (coarse particles) after filtering the resulting polymer dispersion through a 40 mesh standard stainless steel sieve are shown in Table 1.

Comparative Examples 1–4

With the exception of not adding water-soluble organic compounds (A) through (D) as viscosity-increase suppressors, the same procedure was performed as in Synthetic Examples 1–15. The maximum values of torque loaded to the rotary shaft of the agitator during the polymerization reaction, and the results of weighing the amount of coarse particles are shown in Table 1.

TABLE 1

| | | Monomer composition (mol %) | | | | Monomer concentration (%, vs. reaction solution) | Ammonium sulfate concentration (%, vs. reaction solution) | viscosity-increase supressor | | Max. torque (kgf.m) | Amt. on 40 mesh filter (wt %) |
|---|---|---|---|---|---|---|---|---|---|---|---|
| | | DMABC | DMQ | AAM | AAC | | | Type | Amt. added (ppm, vs. reaction solution) | | |
| Examples | 1 | 0 | 10 | 90 | 0 | 15.0 | 29.0 | A5 | 2000 | 1.2 | 0.7 |
| | | | | | | | | C3 | 500 | | |
| | 2 | 0 | 10 | 90 | 0 | 15.0 | 29.0 | B1 | 2500 | 0.8 | 1.1 |
| | | | | | | | | C4 | 100 | | |
| | | | | | | | | D1 | 2500 | | |

TABLE 1-continued

|  |  | Monomer composition (mol %) | | | | Monomer concentration (%, vs. reaction solution) | Ammonium sulfate concentration (%, vs. reaction solution) | viscosity-increase supressor | | Max. torque (kgf.m) | Amt. on 40 mesh filter (wt %) |
|---|---|---|---|---|---|---|---|---|---|---|---|
|  |  | DMABC | DMQ | AAM | AAC |  |  | Type | Amt. added (ppm, vs. reaction solution) |  |  |
|  | 3 | 0 | 10 | 90 | 0 | 15.0 | 29.0 | A2 | 5000 | 0.8 | 0.9 |
|  |  |  |  |  |  |  |  | D1 | 1000 |  |  |
|  | 4 | 15 | 20 | 65 | 0 | 20.0 | 20.0 | B2 | 5000 | 1.0 | 1.0 |
|  | 5 | 15 | 20 | 65 | 0 | 20.0 | 20.0 | B1 | 3000 | 1.2 | 0.8 |
|  |  |  |  |  |  |  |  | D1 | 1000 |  |  |
|  | 6 | 15 | 20 | 65 | 0 | 20.0 | 20.0 | A1 | 6000 | 1.4 | 0.9 |
|  |  |  |  |  |  |  |  | C4 | 100 |  |  |
|  | 7 | 15 | 20 | 65 | 0 | 20.0 | 20.0 | A3 | 7000 | 1.6 | 1.1 |
|  | 8 | 30 | 50 | 20 | 0 | 25.0 | 19.0 | B1 | 2000 | 1.5 | 0.9 |
|  |  |  |  |  |  |  |  | C1 | 50 |  |  |
|  | 9 | 30 | 50 | 20 | 0 | 25.0 | 19.0 | A2 | 5000 | 1.5 | 0.9 |
|  |  |  |  |  |  |  |  | C4 | 50 |  |  |
|  | 10 | 30 | 50 | 20 | 0 | 25.0 | 19.0 | B2 | 2500 | 1.2 | 0.8 |
|  |  |  |  |  |  |  |  | C2 | 50 |  |  |
|  | 11 | 30 | 50 | 20 | 0 | 25.0 | 19.0 | A4 | 2000 | 1.3 | 0.8 |
|  |  |  |  |  |  |  |  | B1 | 1500 |  |  |
|  | 12 | 15 | 20 | 60 | 5 | 20.0 | 20.0 | D1 | 4000 | 1.6 | 0.9 |
|  | 13 | 15 | 20 | 60 | 5 | 20.0 | 20.0 | C4 | 50 | 1.0 | 1.1 |
|  |  |  |  |  |  |  |  | D1 | 3000 |  |  |
|  | 14 | 15 | 20 | 60 | 5 | 20.0 | 20.0 | C5 | 500 | 0.9 | 0.8 |
|  | 15 | 15 | 20 | 60 | 5 | 20.0 | 20.0 | B1 | 1000 | 1.4 | 1.0 |
| Comparative | 1 | 0 | 10 | 90 | 0 | 15.0 | 29.0 | — | — | 4.5 | 54 |
| Examples | 2 | 15 | 20 | 65 | 0 | 20.0 | 20.0 | — | — | 4.5 | 38 |
|  | 3 | 30 | 50 | 20 | 0 | 25.0 | 19.0 | — | — | 4.0 | 14 |
|  | 4 | 15 | 20 | 60 | 5 | 20.0 | 20.0 | — | — | 4.5 | 47 |

ABBREVIATIONS USED IN TABLE:
DMABC: Acryloyloxyethyldimethylbenzylammonium chloride
DMQ: Acryloyloxyethyltrimethylammonium chloride
AAM: Acrylamide
AAC: Acrylic acid
A1: Oxalic acid
A2: Adipic acid
A3: Tartaric acid
A4: Malic acid
A5: Phthalic acid
B1: Resorcinol
B2: Pyrogallol
C1: m-hydroxybenzoic acid
C2: p-hydroxybenzoic acid
C3: Salicylic acid
C4: Gallic acid
C5: Tannic acid
D1: Sodium gluconate (Viscosity-increase suppressor Production Example—E1)

10,000 ppm relative to the amount of monomer of a 1% aqueous solution of V-50 were added to a 1% aqueous solution of methacryloyloxyethyltrimethylammonium chloride followed by allowing to stand for 10 hours after heating to 55° C. while stirring and blowing in air to obtain a brown reaction product. This was designated as an aqueous solution having a 1% concentration of viscosity-increase suppressor E1.

(Viscosity-increase suppressor Production Example—E2)

3,000 ppm relative to the amount of monomer of hydrogen peroxide and 9000 ppm relative to the amount of monomer of ferrous sulfate were added to a 1% aqueous solution of methacryloyloxyethyltrimethylammonium chloride followed by allowing to stand for 10 hours to obtain a brown reaction product. This was designated as an aqueous solution having a 1% concentration of viscosity-increase suppressor E2.

(Viscosity-increase suppressor Production Example—E3)

5000 ppm relative to the amount of MEHQ of V-50 were added to an aqueous solution containing 1000 ppm of MEHQ followed by allowing to stand for 10 hours after heating to 55° C. while stirring and blowing in air to obtain a brown reaction product. This was designated as an aqueous solution having a concentration of 1000 ppm of viscosity-increase suppressor E3.

(Viscosity-increase suppressor Production Example—F1)

5000 ppm relative to the amount of monomer of VA-044 were added to a 3% aqueous solution of methacryloyloxyethyltrimethylammonium chloride followed by allowing to stand for 10 hours at 50° C. in a state of oxygen gas removal in a nitrogen atmosphere to obtain a polymer solution having an intrinsic viscosity of 0.3 dl/g. 5000 ppm of VA-044 were further added to this polymer solution followed by allowing to stand for 10 hours after heating to 55° C. while stirring and blowing in air to obtain a brown reaction product. This was designated as an aqueous solution having a concentration of 3% of viscosity-increase suppressor F1.

(Viscosity-increase suppressor Production Example—G1)

1000 ppm relative to the amount of monomer of VA-044 were added to a 10% aqueous solution of methacryloyloxyethyltrimethylammonium chloride followed by polymerization for 10 hours at 50° C. in a oxygen gas removal state in a nitrogen atmosphere to obtain a polymer solution having an intrinsic viscosity of 1.8 dl/g. 500 ppm relative to the amount of polymer of hydrogen peroxide were further added to this polymer solution followed by diluting to a polymer concentration of 5% with deionized water and allowing to stand for 10 hours at 40° C. to obtain a brown reaction product. This was designated as an aqueous solution having a concentration of 5% of viscosity-increase suppressor G1.

Examples 16–31

With the exception of using the viscosity-increase suppressors described in Table 2, the same procedures as Synthetic Examples 1–15 were performed to obtain polymer dispersions containing fine particles having a particle diameter of 10–20 □m dispersed in an aqueous salt solution. The maximum values of torque applied to the rotary shaft of the agitator during the polymerization reaction are shown in Table 2. In addition, the results of weighing the amount of polymer remaining on a sieve (coarse particles) after filtering the resulting polymer dispersion through a 40 mesh standard stainless steel sieve are shown in Table 2.

Comparative Examples 5–8

With the exception of not using viscosity-increase suppressors, the same procedures were performed as in Synthesis Embodiments 16–31. The maximum values of torque applied to the rotary shaft of the agitator during the polymerization reaction, and the results of weighing the amount of coarse particles are shown in Table 2.

viscosity-increase suppressor listed in Table 3 in the amounts listed in Table 3, and 1 part of polydimethyldiallylammonium chloride (manufactured by CPS Corp., trade name: Age Flock-WT40HV) and 1 part of polyacryloyloxyethyltrimethylammonium chloride (intrinsic viscosity: 2 dl/g) as dispersants were charged in the reaction vessel used in Examples 1–31 followed by the addition of deionized water and salt to reach the monomer concentrations and salt concentrations (co-use of ammonium sulfate and sodium sulfate) described in Table 3 and dissolving by stirring to form a uniform solution. Next, a 5% by weight aqueous solution of VA-044 was added as polymerization initiator in an amount of 100 ppm per monomer followed by stirring and polymerization for 10 hours at 38° C. As a result, polymer dispersions were obtained comprising fine particles having a particle diameter of 10–20 μm dispersed in an aqueous salt solution.

The maximum values of torque loaded to the rotary shaft of the agitator during the polymerization reaction are shown in Table 3. In addition, the results of weighing the amount of polymer remaining on a sieve (coarse particles) after filtering the resulting polymer dispersion through a 40 mesh standard stainless steel sieve are shown in Table 3.

Comparative Examples 9–10

With the exception of not adding viscosity-increase suppressors, the same procedures were performed as in

TABLE 2

| | | Monomer composition (mol %) | | | | Monomer concentration (%, vs. reaction solution) | Ammonium sulfate concentration (%, vs. reaction solution) | viscosity-increase supressor | | Max. torque (kgf.m) | Amt. on 40 mesh filter (wt %) |
|---|---|---|---|---|---|---|---|---|---|---|---|
| | | DMABC | DMQ | AAM | AAC | | | Type | Amt. added (ppm, vs. reaction solution) | | |
| Examples | 16 | 0 | 10 | 90 | 0 | 15.0 | 29.0 | E1 | 3000 | 1.5 | 1.1 |
| | 17 | 15 | 20 | 65 | 0 | 20.0 | 20.0 | E2 | 3000 | 1.5 | 0.8 |
| | 18 | 30 | 50 | 20 | 0 | 25.0 | 19.0 | E1 | 3000 | 1.4 | 1.0 |
| | 19 | 15 | 20 | 60 | 5 | 20.0 | 20.0 | E2 | 3000 | 1.4 | 0.9 |
| | 20 | 0 | 10 | 90 | 0 | 15.0 | 29.0 | E1 | 3000 | 1.3 | 0.9 |
| | 21 | 15 | 20 | 65 | 0 | 20.0 | 20.0 | E2 | 3000 | 1.3 | 0.8 |
| | 22 | 30 | 50 | 20 | 0 | 25.0 | 19.0 | E1 | 3000 | 1.3 | 0.9 |
| | 23 | 15 | 20 | 60 | 5 | 20.0 | 20.0 | E2 | 3000 | 1.3 | 0.8 |
| | 24 | 0 | 10 | 90 | 0 | 15.0 | 29.0 | F1 | 3000 | 1.5 | 1.1 |
| | 25 | 15 | 20 | 65 | 0 | 20.0 | 20.0 | G1 | 3000 | 1.5 | 0.8 |
| | 26 | 30 | 50 | 20 | 0 | 25.0 | 19.0 | E3 | 150 | 1.4 | 1.0 |
| | 27 | 15 | 20 | 60 | 5 | 20.0 | 20.0 | F1 | 3000 | 1.4 | 0.9 |
| | 28 | 0 | 10 | 90 | 0 | 15.0 | 29.0 | E3 | 150 | 1.3 | 0.9 |
| | 29 | 15 | 20 | 65 | 0 | 20.0 | 20.0 | F1 | 3000 | 1.3 | 0.8 |
| | 30 | 30 | 50 | 20 | 0 | 25.0 | 19.0 | G1 | 3000 | 1.3 | 0.9 |
| | 31 | 15 | 20 | 60 | 5 | 20.0 | 20.0 | G1 | 3000 | 1.3 | 0.8 |
| Comparative Examples | 5 | 0 | 10 | 90 | 0 | 15.0 | 29.0 | — | — | 4.5 | 54.0 |
| | 6 | 15 | 20 | 65 | 0 | 20.0 | 20.0 | — | — | 4.5 | 38.0 |
| | 7 | 30 | 50 | 20 | 0 | 25.0 | 19.0 | — | — | 4.5 | 14.0 |
| | 8 | 15 | 20 | 60 | 5 | 20.0 | 20.0 | — | — | 4.5 | 47.0 |

ABBREVIATIONS USED IN TABLE:
DMBAC: Acryloyloxyethyldimethylbenzylammonium chloride
DMQ: Acryloyloxyethyltrimethylammonium chloride
AAM: Acrylamide
AAC: Acrylic acid Examples 32–35

The monomers having compositions and concentrations listed in Table 3, the compounds (A) through (G) as a Synthesis Examples 32–35. The maximum values of torque loaded to the rotary shaft of the agitator during the polymerization reaction, and the results of weighing the coarse particles are shown in Table 3.

TABLE 3

| | Monomer composition (mol %) | | | | Monomer concentration (%, vs. reaction solution) | suppressor Salt concentration (%, vs. reaction solution) | | Viscosity-increase | | Max. torque (kgf.m) | Amt. on 40 mesh filter (wt %) |
|---|---|---|---|---|---|---|---|---|---|---|---|
| | DMABC | DMQ | AAM | AAC | | Ammonium sulfate | Sodium sulfate | Type | Amt. added (ppm, vs. reaction solution) | | |
| Examples 32 | 32 | 0 | 20 | 80 | 0 | 15.0 | 25.8 | 3.4 | C4 D1 | 50 2500 | 1.4 | 1.0 |
| 33 | 0 | 20 | 80 | 0 | 15.0 | 25.8 | 3.4 | A2 D1 E1 | 5000 200 1500 | 1.4 | 0.8 |
| 34 | 0 | 35 | 65 | 0 | 15.0 | 22.4 | 6.8 | C4 D1 | 50 3500 | 1.5 | 1.0 |
| 35 | 0 | 35 | 65 | 0 | 15.0 | 22.4 | 6.8 | A2 D1 G1 | 4000 1000 3000 | 1.5 | 1.2 |
| Comparative Examples 9 | 9 | 0 | 20 | 80 | 0 | 15.0 | 25.8 | 3.4 | — | — | 5.6 | 83.0 |
| 10 | 0 | 35 | 65 | 0 | 15.0 | 22.4 | 6.8 | — | — | 6.7 | 95.0 |

INDUSTRIAL APPLICABILITY

The Synthesis Examples of the present invention containing the viscosity-increase suppressors (A) through (G) each reduces maximum torque values and the amount of coarse particles in comparison with the comparative synthesis examples of the prior art. Namely, the present invention offers advantages in terms of design and operation of the reactor, in terms of quality of the resulting water-soluble polymer dispersion, and offers significant economic effects.

What is claimed is:

1. A process for producing a water-soluble polymer dispersion comprising polymerizing water-soluble monomers having double bonds in an aqueous salt solution that dissolves the monomers but does not dissolve the formed polymer while stirring in the presence of a dispersant composed of a polymer electrolyte soluble in said aqueous salt solution to obtain fine polymer particles dispersed in the aqueous salt solution, characterized by adding to the polymerization at least one viscosity-increase suppressor selected from the group consisting of:

(A) a polyvalent carboxylic acid or a salt thereof, (B) a polyvalent phenol, (C) a cyclic compound containing a hydroxyl group and a carboxyl group or a salt thereof, (D) gluconic acid or a salt thereof, (E) a reaction product obtained by reacting methoxyhydroquinone and/or (meth)acrylic cationic monomer with a compound that generates radicals in an oxidizing atmosphere, (F) a reaction product obtained by reacting (meth)acrylic cationic polymer with a compound that generates radicals in an oxidizing atmosphere, (G) a reaction product obtained by reacting (meth)acrylic cationic polymer with an oxidant, and a mixture thereof.

2. The process for producing a water-soluble polymer dispersion s set forth in claim 1, wherein the water-soluble monomers having double bonds are composed of 0–30 mol % acrylic acid, 0–100 mol % acrylamide and 0–100 mol % cationic monomer represented by the following formula 1 and/or the following formula 2:

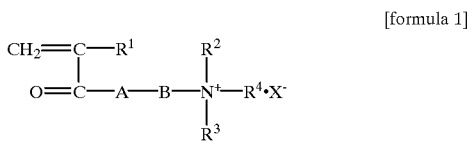

[formula 1]

(wherein, A represents O or NH, B represents $C_2H_4$, $C_3H_6$ or $C_3H_5OH$, $R^1$ represents H or $CH_3$, $R^2$ and $R^3$ represent an alkyl group having 1–4 carbon atoms, $R^4$ represents hydrogen, an alkyl group having 1–4 carbon atoms or benzyl group, and $X^-$ represents a counter ion);

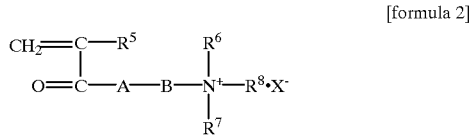

[formula 2]

(wherein, A represents O or NH, B represents $C_2H_4$, $C_3H_6$ or $C_3H_5OH$, $R^5$, $R^6$, $R^7$ and $R^8$ represent H or $CH_3$, and $X^-$ represents a counter ion).

3. The process for producing a water-soluble polymer dispersion as set forth in claim 1, wherein said dispersant is a cationic polymer electrolyte in which 50–100 mol % of at least one type of cationic monomer selected from the group consisting of dimethylaminoethyl(meth)acrylate salt, dimethylaminopropyl(meth)acrylamide salt, di(meth)allylamine salt, (meth)acryloyloxyethyltrimethylammonium chloride, (meth)acrylamidopropyltrimethylammonium chloride, dimethyldiallylammonium chloride and a mixture thereof, and 50–0 mol % acrylamide are polymerized.

4. The process for producing a water-soluble polymer dispersion as set forth in claim 1, wherein the salt that forms the aqueous salt solution is a bivalent anionic salt.

5. The process for producing a water-soluble polymer dispersion as set forth in claim 1, wherein the (A) polyvalent carboxylic acid or the salt thereof is one selected from oxalic acid, adipic acid, tartaric acid, malic acid, phthalic acid and salts thereof.

6. The process for producing a water-soluble polymer dispersion as set forth in claim 1, wherein the (B) polyvalent phenol is resorcinol or pyrogallol.

7. The process for producing a water-soluble polymer dispersion as set forth in claim 1, wherein the (C) cyclic compounds having a hydroxyl group and a carboxyl group is one selected from m-hydroxybenzoic acid, p-hydroxybenzoic acid, salicylic acid, gallic acid, tannic acid and salts thereof.

8. The process for producing a water-soluble polymer dispersion as set forth in claim 1, wherein the viscosity-increase suppressor (E) is obtained by reacting a compound that generates radicals in an oxidizing atmosphere in a solution containing methoxyhydroquinone and/or (meth) acrylic cationic monomer.

9. The process for producing a water-soluble polymer dispersion as set forth in claim 1, wherein the total added amount of the viscosity-increase suppressors represented by (A) through (G) above is from 10 ppm to 10,000 ppm relative to the weight of the reaction solution.

10. The process of producing a water-soluble polymer dispersion as set forth in claim 1, wherein the viscosity-increase suppressor is the member of the group which is a reaction product obtained by reacting (meth)acrylic cationic polymer with a compound that generates radicals in an oxidizing atmosphere.

11. The process of producing a water-soluble polymer dispersion as set forth in claim 1, wherein the viscosity-increase suppressor is the member of the group which is a reactoin product obtained by reacting (meth)acrylic cationic polymer with an oxidant.

* * * * *